Patented Dec. 9, 1941

2,265,919

UNITED STATES PATENT OFFICE 2,265,919

TREATMENT OF ALKALI SOLUBLE CELLULOSE ETHERS

Leon Lilienfeld, Vienna, Austria; Antonie Lilienfeld, administratrix of said Leon Lilienfeld, deceased, assignor to Lilienfeld Patents Inc., Boston, Mass., a corporation of Massachusetts No Drawing. Application August 17, 1937, Serial No. 159,606. In Great Britain September 2, 1936

2 Claims. (Cl. 260—232)

Alkyl derivatives of cellulose which are soluble in caustic alkali solution but which are insoluble or only scarcely soluble in water and processes for making same and processes for converting them into shaped structures are for the first time described in my U. S. Patents Nos. 1,589,606, 1,683,831, 1,683,682 and in my U. S. application Ser. No. 521,022 and application Ser. No. 521,023 and a companion case 521,017.

Furthermore, hydroxy-alkyl derivatives of cellulose which are soluble in caustic alkali solution but which are insoluble or only scarcely soluble in water and processes for making same and processes for converting them into shaped structures are for the first time described in my U. S. Patents Nos. 1,722,927 and 1,722,928.

Finally, hydroxy-paraffin-monocarboxylic acid derivatives of cellulose which are soluble in caustic alkali solution but which are insoluble or only scarcely soluble in water and processes for making same and processes for converting them into shaped structures are for the first time described in my U. S. Patents Nos. 1,682,292, 1,682,293 and 1,682,294.

Alkali-solubility of cellulose ethers attended by insolubility in water is in a functional relationship to the number of hydroxyl hydrogen atoms of cellulose which are substituted by alcohol radicals. It may be taken as a general rule that, in most cases, alkali-soluble cellulose ethers do not contain substantially more than one (and usually contain less than one) alcohol radical introduced ether fashion per one $C_6H_{10}O_5$-molecular unit of cellulose.

My research-work on alkali-soluble cellulose ethers, which by now has extended over about 19 years, has shown that such alkali-soluble cellulose ethers as contain not more than one alcohol radical introduced ether fashion into the cellulose molecule per about 2, and preferably not more than one introduced alcohol radical per about 4 to 5 $C_6H_{10}O_5$-molecular units of cellulose, are particularly valuable parent materials for the preparation of shaped structures.

But even such alkali-soluble cellulose ethers as contain not more than one introduced alcohol radical per about 8 to 10 or 15, and even about 16 to 30 and more $C_6H_{10}O_5$-molecular units of cellulose, have proved technically valuable.

The correctness of my theory illustrated above by figures, that alkali-solubility in conjunction with prominent technical utility exists in cellulose ethers only when they contain less, preferably substantially less, than one introduced alcohol radical per one $C_6H_{10}O_5$-molecular unit of cellulose, follows i. a. from the fact that, guided by the conception of the interdependence between solubility in caustic alkali solution on the one hand and the ratio of introduced alcohol radicals on the other, since the beginning of my research-work on alkali-soluble cellulose ethers I have used proportions of etherifying agents which, from the outset, warrant such ratios of introduced alcohol radicals as come within the scope of the ratios set forth in the foregoing paragraph.

In this respect and with regard to alkyl ethers of cellulose, I refer by way of example to the Examples I, II and III of my U. S. Patent No. 1,589,606 of June 22, 1906, filed March 20, 1922 (convention date April 2, 1921), in whose lower limit one mol. of ethyl chloride is used per 3.18 $C_5H_{10}O_5$-molecular units of cellulose, or to the Example VII of same specification, in whose lower limit one molecule of di-ethyl sulphate is used per 3.33 $C_6H_{10}O_5$-molecular units of cellulose, further to the Examples I to III, V, VI and IX of my U. S. Patent No. 1,683,831 of Sept. 11, 1928, filed June 16, 1923 (convention date: July 13, 1922), in which one mol. of ethyl chloride is used per 1.316 or 2.632 or 3.95 or 1.6 respectively $C_6H_{10}O_5$-molecular units of cellulose, further to the Examples 1 to 19 of my U. S. application Ser. No. 521,023 of March 7, 1931 (convention date: March 15, 1930, corresponding to British Patent No. 357,167) and to the Examples I and II of my U. S. application Ser. No. 521,017 of same date, corresponding to British Patent No. 357,527, and to the Examples 1 to 6 and 10 to 12 of my U. S. application Ser. No. 521,022 of March 7, 1931 (convention date: March 14, 1930), corresponding to British Patent No. 374,964 in which one mol. of di-methyl sulphate or di-ethyl sulphate is used per 1.28 or 1.57 or 2.56 or 3.15 or 4.75 or 5.16 or 7.7 or 9.51 or 15.5 $C_6H_{10}O_5$-molecular units of cellulose and finally to my U. S. application Ser. No. 71,254 of March 27, 1936 (convention date: March 29, 1935), corresponding to British Patent No. 459,122 in which proportions of ethylating agents smaller than one mol. of ethylating agent per 4 $C_6H_{10}O_5$-molecular units of cellulose are used.

With regard to alkali-soluble hydroxy-alkyl ethers of cellulose, I refer by way of example to the Examples 1 and 6 of my U. S. Patent No. 1,722,927 of July 30, 1929, filed March 17, 1925 (convention date: April 4, 1924), in which one mol. of alpha-mono-chlorohydrin is used per 2.5 $C_6H_{10}O_5$-molecular units of cellulose or to the Example 5 of same specification in whose lower limit one mol. of ethylene chlorohydrin is used per 1.64 C₆H₁₀O₅-molecular units of cellulose or to the Examples 1 to 3 and 17 to 19 of my U. S. Patent No. 1,858,097 of May 10, 1932, filed March 13, 1930 (convention date: March 16, 1929), in which one mol. of alpha-mono-chlorohydrin is used per 2.26 to 6.82 C₆H₁₀O₅-molecular units of cellulose and to the Examples 4 or 5 or 9 or 11 of same specification in which one mol. of ethylene chlorohydrin is used per 1.65 or per 2.48 or per 4.96 C₆H₁₀O₅-molecular units of cellulose and finally to my U. S. application Ser. No. 71,255 of March 27, 1936 (convention date: March 29, 1935), in which proportions of hydroxy-alkylating agents smaller than one mol. of hydroxy-alkylating agent per 9 C₆H₁₀O₅-molecular units of cellulose are used.

Finally, with regard to hydroxy acid ethers of cellulose, I refer by way of example to the Examples 1 to 3 of my U. S. Patent No. 1,682,292 of Aug. 28, 1928, filed July 23, 1924 (convention date: April 4, 1924), in which one mol. of mono-chloroacetic acid is used per 1.14 or 5.5 or 5.39 respectively C₆H₁₀O₅-molecular units of cellulose.

Since, in the etherifying operation, not the whole amount of the etherifying agent is used up for the substitution of hydroxyl hydrogen atoms of the cellulose molecule, the number of the alcohol radicals which are contained in the cellulose ethers produced according to the aforementioned processes is considerably smaller than the number of alcohol radicals computed on the basis of the proportions of the etherifying agents used. To illustrate this fact, it is pointed out by way of example that, as far as they are prepared by means of 12.5 per cent. of ethyl chloride, the products of the Examples I, II and III of my U. S. Patent No. 1,589,606 which theoretically should contain one ethyl group per 3.18 C₆H₁₀O₅-molecular units of cellulose, are found by analysis to contain one ethyl group per about 11.1 (Example I) or 9.6 (Example II) or 8.54 (Example III C₆H₁₀O₅-molecular units of cellulose), and that the products of the Examples 1 to 19 of my U. S. application Ser. No. 521,023, instead of the theoretical ratios set forth above, in analytical reality contain one methyl group per 5.35 (instead of 1.28) or per 5.6 (instead of 2.56) or per 6.5 (instead of 5.16) or per 12.7 (instead of 7.7) C₆H₁₀O₅-molecular units of cellulose, and one ethyl group per 5.73 (instead of 3.15) or per 3.54 (instead of 1.57) C₆H₁₀O₅-molecular units of cellulose.

By the foregoing statements I do not mean to say that alkali-soluble cellulose ethers cannot be produced by means of proportions of etherifying agents equalling or exceeding one mol. of etherifying agent per one C₆H₁₀O₅-molecular unit of cellulose. For, when in the reacting mass the proportion of caustic alkali to cellulose and/or to water is kept within appropriate limits, and when the time and temperature of the reaction are suitably chosen, alkali-soluble cellulose ethers are obtained even when one or more mol. of the etherifying agent are used per one C₆H₁₀O₅-molecular unit of cellulose. According to my present knowledge, as far as they are insoluble in water and convertible into shaped structures or other useful articles possessing valuable properties, particularly a perfectly satisfactory tensile strength in the dry and especially in the wet state and a satisfactory extensibility, also such alkali-soluble cellulose ethers as are prepared by means of proportions of etherifying agents not smaller than, or exceeding, one mol. of etherifying agent per one C₆H₁₀O₅-molecular unit of cellulose contain less than one etherwise introduced alcohol radical per one C₆H₁₀O₅-molecular unit of cellulose. In this respect attention is called for instance to the upper limit of Example III of my U. S. Patent No. 1,589,606 in which one mol. of ethyl chloride is used per 0.88 C₆H₁₀O₅-molecular units of cellulose and which example, nevertheless, produces an alkali-soluble, water-insoluble, ethyl cellulose containing one ethyl group per 5.8 C₆H₁₀O₅-molecular units of cellulose, or to Example IA of my U. S. application Ser. No. 71,260 in which one mol. of ethyl chloride is used per 0.395 (lower limit) or per 0.197 (upper limit) C₆H₁₀O₅-molecular units of cellulose and which example produces at 50 or 60 or 70° C. alkali-soluble ethyl celluloses containing one ethyl group per 9.8 to 6.2 (lower limit) or per 7.7 to 4.99 (upper limit) C₆H₁₀O₅-molecular units of cellulose. But even the alkali-soluble, water-insoluble ethyl celluloses of Example IB of same application, in which one mol. of ethyl chloride is used per 0.131 (lower limit) or per 0.0425 (upper limit) C₆H₁₀O₅-molecular units of cellulose, contain one ethyl group per 7.54 to 6.97 (lower limit) or per 6.33 to 5.02 (upper limit) C₆H₁₀O₅-molecular units of cellulose. I further refer to Examples VI and VII of my U. S. application Ser. No. 521,017 in which 3.05 (Example VI) or 2.31 (Example VII) respectively mol. of di-ethyl sulphate are used per one C₆H₁₀O₅-molecular unit of cellulose and which result in alkali-soluble, water-insoluble ethyl celluloses that contain one ethyl group per 8.28 and, when the time of the reaction is 72 hours, per 3.37 (Example VI) or per 10.57 and, when the time of the reaction is 72 hours, per 3.9 (Example VII) C₆H₁₀O₅-molecular units of cellulose. I further call attention to Examples 7 and 8 of my U. S. application Ser. No. 521,022 in which one mol. of di-methyl sulphate is used per 0.77 (Example 7) or per 0.51 (Example 8 C₆H₁₀O₅-molecular units of cellulose), whilst the alkali-soluble, water-insoluble methyl celluloses resulting from these examples contain one methyl group per 3.28 (Example 7) or per 2.96 (Example 8) C₆H₁₀O₅-molecular units of cellulose, or to Example 9 of same specification in which one mol. of di-ethyl sulphate is used per 0.869 C₆H₁₀O₅-molecular units of cellulose and which nevertheless results in an alkali-soluble, water-insoluble ethyl cellulose that contains one ethyl group per 3.79 C₆H₁₀O₅-molecular units of cellulose.

Regardless of whether they are produced by means of molecular proportions of etherifying agents which are smaller than one mol. of the etherifying agent per one C₆H₁₀O₅-molecular unit of cellulose or by means of molecular proportions of etherifying agents which are not smaller but which are larger than one mol. of the etherifying agent per one C₆H₁₀O₅-molecular unit of cellulose, most of the alkali-soluble, water-insoluble cellulose ethers of the aforementioned types which are convertible into shaped structures (such as artificial threads or film or dressings of fabrics etc.) having perfectly satisfactory dynamometric properties, are insoluble or practically insoluble or only incompletely or partially soluble in caustic alkali solution at room temperature. For example: Among those cellulose ethers which are incompletely or partially soluble in caustic alkali solution, the proportion of the part which is soluble in caustic alkali solution at room temperature to the part which is insoluble in caustic alkali solution at room temperature varies in my aforementioned processes within very wide limits, for instance between 40 to 90 per cent. of the soluble to 60 to 10 per cent. of the insoluble part (see for example the relative examples of my U. S. Patents Nos. 1,683,682 and 1,683,831) and in many instances even between 10 to 20 per cent. of the soluble to 90 to 80 per cent. of the insoluble part.

Consequently, since the separation of the cellulose ethers of the aforementioned types into their constituents which are soluble in caustic alkali solution at room temperature and into their constituents which are insoluble in caustic alkali solution at room temperature complicates the process and, in most cases, entails a substantial loss of substance, soon after having synthesized the first alkali-soluble cellulose ethers, I had to look for a way towards bringing into solution in caustic alkali solution the whole substance of the cellulose ethers having the composition set forth in the fourth, fifth and sixth paragraphs of this description. The outcome of my endeavours in this direction was the process laid down in my British Patent No. 212,864 of March 15, 1923, which resides in my discovery that it is possible to make the whole substance of the cellulose ethers of the aforementioned types soluble in caustic alkali solution at room temperature by contacting them with caustic alkali solution and cooling the thus obtained suspensions or incomplete solutions to a temperature between plus 5° C. and minus 25° C. and thereafter allowing the temperature to rise to room temperature or to a temperature between room temperature and 0° C. (See for instance page 3, lines 62 to 71 of my British Patent No. 212,864, where the making of solutions of alkali-soluble cellulose ethers by refrigeration is described for the first time.)

The solutions thus obtained can be worked up into shaped structures having very good dynamometric properties. On the other hand, the process of my British Patent No. 212,864 entails additional cost which weighs down the economy of the utilisation for practical purposes of the cellulose ethers of the aforementioned types; all the more so, since most of these ethers can be made soluble or completely soluble in caustic alkali solution at room temperature only by cooling their suspensions or incomplete solutions in caustic alkali solution until freezing occurs. The temperatures meeting this requirement being very low (in general not higher than minus 10° C.) the additional cost caused by the freezing operation is considerable.

In addition, (unless, owing to an unduly prolonged maturing of the alkali cellulose and/or owing to the maturing of the alkali cellulose having been conducted at a temperature substantially exceeding room temperature, for example at 25 or 30° C. or higher, the cellulose component of the cellulose ethers of the aforementioned types is deeply degraded and therefore the cellulose ethers or the shaped structures produced therefrom little resistant to water) in many cases the filtering capacity of the cellulose ether solutions is rather poor; so much so, that very frequently filtration through cotton wool is only possible with the aid of a pressure of 6 to 10 atmospheres or even more, and that, notwithstanding, the filtration proceeds very slowly and also this only, when the cotton wool is changed from time to time.

It is highly probable that the poor filtering capacity of the solutions of the cellulose ethers of the aforementioned types is due to their viscosity and to their physical character. These properties of the solutions have an unfavourable influence not only on the filtering capacity, but, what is more important, on the smoothness of the working up of the solutions into shaped structures, such as artificial threads or film or the like. For, it is not a rare occurrence that, owing to their slimy condition, the solutions of the cellulose ethers of the aforementioned types partly or wholly clog the spinning nozzles of the artificial silk spinning machines or the hoppers of the film casting machines, thus making the artificial thread spinning operation or the film spinning operation difficult and sometimes even impossible.

The present invention does away with all these drawbacks of the cellulose ethers of the aforementioned types.

The generic principle underlying the present invention consists in my discovery that alkali-soluble, water-insoluble cellulose ethers of superior qualities are obtained when alkali-soluble, water-insoluble cellulose ethers are exposed to a temperature exceeding 40° C., or exceeding 80° C. and preferably not lower than 100° C.

Specifically the present invention is based on the conception (1) That, when cellulose ethers, which are insoluble or only incompletely or partially soluble in caustic alkali solution at room temperature or at any temperature between room temperature and the temperature at which their suspensions or incomplete solutions in caustic alkali solution freeze or form crystals and which can be made soluble or completely soluble in caustic alkali solution at room temperature and/or at a temperature between room temperature and the temperature at which their suspensions or incomplete solutions in caustic alkali solution freeze or form crystals by cooling their suspensions or incomplete solutions until they freeze or form crystals, are exposed to a temperature exceeding 40° C., or exceeding 80° C. and preferably not lower than 100° C., cellulose ethers are obtained which are soluble in caustic alkali solution at a temperature above the temperature at which their suspensions or incomplete solutions in caustic alkali solution freeze or form crystals, (2) That, when cellulose ethers, which are insoluble in caustic alkali solution at room temperature, but which are soluble therein at a temperature between room temperature and the temperature at which their suspensions or incomplete solutions freeze or form crystals, are exposed to a temperature exceeding 40° C., or exceeding 80° C. and preferably not lower than 100° C., cellulose ethers are obtained which are soluble in caustic alkali solution at a temperature which is higher than the temperature at which the parent cellulose ethers are soluble therein, (3) That, when (a) cellulose ethers, which are insoluble or only incompletely or partially soluble in caustic alkali solution at room temperature or at any temperature between room temperature and the temperature at which their suspensions or incomplete solutions in caustic alkali solution freeze or form crystals and which can be made soluble or completely soluble in caustic alkali solution at room temperature or at a temperature between room temperature and the temperature at which their suspensions or incomplete solutions in caustic alkali solution freeze or form crystals by cooling their suspensions or incomplete solutions until they freeze or form crystals, or (b) Cellulose ethers which are insoluble in caustic alkali solution at room temperature, but which are soluble therein at a temperature between room temperature and the temperature at which their suspensions or incomplete solutions freeze or form crystals, or (c) Cellulose ethers which are soluble in caustic alkali solution at room temperature are exposed to a temperature exceeding 40° C., or exceeding 80° C. and preferably not lower than 100° C., cellulose ethers are obtained the solutions of which have a better filtering capacity and/or a lower viscosity and/or a better spinnability than the parent cellulose ethers, and (4) That, when cellulose ethers, which are insoluble or only incompletely or partially soluble in caustic alkali solution at room temperature or at any temperature between room temperature and the temperature at which their suspensions or incomplete solutions in caustic alkali solution freeze or form crystals and which can be made soluble or completely soluble in caustic alkali solution at room temperature or at a temperature between room temperature and the temperature at which suspensions or incomplete solutions in caustic alkali solution freeze or form crystals by cooling their suspensions or incomplete solutions until they freeze or form crystals, are exposed to a temperature exceeding 40° C., or exceeding 80° C. and preferably not lower than 100° C., without becoming soluble in caustic alkali solution at a temperature above the temperature at which their suspensions or incomplete solutions in caustic alkali solution freeze or form crystals, cellulose ethers are obtained the solutions of which have a better filtering capacity and/or a lower viscosity and/or a better spinnability than the parent cellulose ethers.

In other words:

The present process is based upon the specific inventive principle (1) That, when such alkali-soluble cellulose ethers as are insoluble or only incompletely or partially soluble in caustic alkali solution at room temperature or at any temperature between room temperature and the temperature at which their suspensions or incomplete solutions in caustic alkali solution freeze or form crystals and which can be made soluble or completely soluble in caustic alkali solution at room temperature or at a temperature between room temperature and the temperature at which their suspensions or incomplete solutions in caustic alkali solution freeze or form crystals by cooling their suspensions or incomplete solutions until they freeze or form crystals, for example cellulose ethers containing not more than one alcohol radical introduced ether fashion into the cellulose molecule per about 2, preferably per about 5 and even per 10 to 15 or 16 to 30 $C_6H_{10}O_5$-molecular units of cellulose, are exposed to a temperature exceeding 40° C., or exceeding 80° C. and preferably not lower than 100° C., technically valuable cellulose ethers are obtained which are soluble in caustic alkali solution at room temperature or at a temperature between 0° C. and room temperature or, at the worst, at a temperature below 0° C. but higher than the freezing temperature of their suspensions or incomplete solutions in dilute caustic alkali, and (2) That, when such cellulose ethers, for example cellulose ethers containing not more than one alcohol radical introduced ether fashion into the cellulose molecule per about 2, preferably per about 5 and even per 10 to 15 or 16 to 30 $C_6H_{10}O_5$-molecular units of cellulose, as are soluble in caustic alkali solution at room temperature or at a temperature between room temperature and the freezing temperature of their suspensions or incomplete solutions in caustic alkali solution or as can only be made soluble in caustic alkali solution at room temperature or at a temperature between room temperature and the freezing temperature by refrigerating their suspensions or incomplete solutions in caustic alkali solution, are exposed to a temperature exceeding 40° C., or exceeding 80° C. and preferably not lower than 100° C., in some cases cellulose ethers are obtained which, although having the same solubility relationships as the parent cellulose ethers, display superior properties in other respects, particularly a superior filtering and/or a superior spinning capacity.

The present invention is further based on the observation that in many cases the improved solubility and/or filterability and/or spinnability of the cellulose ethers prepared according to the present invention may be further ameliorated by after-treating them with one or more substances having acid reaction, such as dilute acids, or solutions of acid salts at a temperature not substantially exceeding room temperature.

Considering our knowledge regarding the effect of acid substances on cellulose derivatives, it is rather surprising that, in some cases, the dynamometric properties, particularly the wet tenacity and extensibility of shaped structures made from such products of the invention as are after-treated with a medium containing an acid or acid salt are better than the dynamometric properties of shaped structures produced from products of the invention prepared in the same manner but not after-treated with an acid medium.

The technical advances marked by, and thus the objects of, the present invention are:

I. Improving the solubility and moving up the temperature requisite for the dissolution in caustic alkali solution of numerous alkali-soluble cellulose ethers which are or can be dissolved only at temperatures below room temperature. In many cases, in which freezing and thawing is indispensable or at least helpful, this effect of the invention allows of dispensing with the freezing and liquefying step in the dissolving operation.

This important improvement can be realized also with such alkali-soluble cellulose ethers as are prepared by means of highly reduced quantities of etherifying agents, for example by means of proportions of etherifying agents which are not larger and preferably which are even smaller than one mol. of etherifying agent per 4 to 5 $C_6H_{10}O_5$-molecular units of cellulose.

II. Amelioration of the filterability and spinnability of technically suitable alkali-soluble cellulose ethers, such cellulose ethers included as (owing to their nature and/or to the fact that, on being applied to them, the present process has not been driven far enough), on being treated according to the present process, are not improved as set out above under I and/or such cellulose ethers included as are soluble in caustic alkali solution at room temperature.

Other objects of the invention will become apparent from the following description.

Although, at bottom, the carrying out of the present process in practice is comparatively simple, the working conditions may be varied within wide limits. It is therefore not intended to limit the invention to the following description and to the examples illustrating the practical execution of the process, i. e. to the particulars given therein as to the types of the alkali-soluble cellulose ethers (i. e. as to the nature of the alcohol radical or radicals etherwise introduced into the cellulose molecule and as to the representatives set forth by way of examples for the various types of cellulose ethers and as to the processes or methods for the production of the cellulose ethers), as to the temperature or temperatures and duration of the treatment of the cellulose ethers according to the present invention, as to the condition of the cellulose ethers during their exposure to heat according to the present process, as to details of the treatment according to the present process, as to the substances which optionally may be added to the cellulose ethers before or during the treatment according to the present process, as to the processes or methods and temperatures of the preparation of the cellulose ether solutions, as to the quantitative composition of the cellulose ether solutions, as to the substances which optionally may be added to the cellulose ether solutions, as to the methods of working up the cellulose ether solutions into shaped structures or other useful articles, as to the methods of converting the cellulose ethers prepared according to the present invention into their derivatives, such as xanthates, as to the methods for working up the cellulose ether xanthates made according to the present invention into shaped structures, as to the after-treatment of the shaped structures or other useful articles produced according to the present invention etc. etc.

As stated above, the carrying out of the invention in practice comprises exposing one or more cellulose ethers of the aforementioned types to a temperature or temperatures exceeding 40° C. or exceeding 80° C. and preferably not lower than 100° C. According to the present state of my knowledge, it seems that the best results are obtained at a temperature or temperatures lying between 100 and 160° C. But, when the duration of the heating operation is to be very short, for example 1 hour or 30 minutes or 5 to 15 minutes, also higher temperatures, e. g. temperatures up to 200 to 250° C. may be used.

The cellulose ethers may be treated according to the present process in the dry or air-dry or moist or wet condition. According to my present knowledge, i. e. to the experience gathered hitherto, it seems that the best results are obtained when the cellulose ethers of the aforementioned types are treated according to the present process in the dry or air-dry state.

The exposure of the cellulose ethers to heat according to the present process may take place in the presence of air or of another gas (such as hydrogen or nitrogen or carbon dioxide) at atmospheric or at an increased pressure or at a reduced pressure (i. e. in a more or less complete vacuum) and may be effected in open vessels or in closed vessels, such as autoclaves, and may be conducted in perfect rest or with continuous or intermittent stirring, kneading or otherwise agitating, for example by allowing the vessel in which the heating takes place to rotate.

To accelerate and/or intensify the action of the heat on the cellulose ether under treatment, one or more catalyzers may be added to the cellulose ether, for example a thorium salt or a cerium salt or a small quantity of an alcohol, such as ethanol or methanol or glycol, or of an inorganic or organic nitrogen base, for example ammonia or an alkyl amine, for example dimethyl amine or an aromatic base, for instance di-methyl aniline or any other suitable catalyzer.

The duration of the heating may be varied within wide limits and depends partly on the nature and properties, particularly solubility and viscosity of the cellulose ether under treatment and partly on the desired degree of the change in solubility and/or viscosity of the cellulose ether treated on the one hand, and on the temperature at which the heating operation is conducted on the other. The experience gathered hitherto seems to indicate that the duration of the heating is in inverse proportion to the temperature. To give an example: Whereas a heating of 2 to 3 hours at 100 to 120° C. suffices to make certain hydroxy-ethyl celluloses which are soluble in caustic alkali solution only at low temperatures for example at 0 to minus 4° C., soluble in caustic alkali solution at room temperature, a heating of at least 12 hours is necessary to obtain the same result at 50 to 60° C.

The products of the invention may be worked up into shaped structures or other useful articles either without being subjected to any after-treatment or, if desired, after having been washed or washed and thereafter dried.

As stated above, in many cases, the products of the invention are further improved by an after-treatment with a medium containing an acid or an acid salt. For this purpose an inorganic or organic acid may be used, for example hydrochloric acid or sulphuric acid of 0.2 to 10 per cent. strength or the like. Since, when applied at a temperature substantially exceeding room temperature, even very dilute acids, particularly mineral acids, exert a hydrolyzing action on the cellulose molecule contained in the alkali-soluble cellulose ethers and, thus, greatly impair and in many cases destroy their film- and thread forming properties and, accordingly, their suitability for the production of film, threads or the like, not to damage the products of the present invention, the treatment with acids and even with very dilute acids, particularly mineral acids, must be conducted at room temperature or at a temperature below room temperature, at any rate at a temperature not substantially exceeding room temperature.

Good results are obtained, for instance, when the products of the invention are treated with hydrochloric or sulphuric acid of 0.5 to 3 per cent. strength at room temperature for, say, 2 to 12 hours.

It is to be understood that in the present invention alkali-soluble cellulose ethers may be used as parent materials which are made by any process or method whatever, for instance according to any one of the processes and/or methods described in my U. S. Patents Nos. 1,589,606, 1,683,831, 1,683,682, 1,722,927, 1,682,292, and 1,682,294 or according to any one of the processes or methods described in my U. S. applications Ser. Nos. 521,022, 521,026, 71,250, 71,251, 71,252, 71,253, 71,254, 71,255, 71,260, 71,261, 71,262 and 91,790 or according to any other process or method suitable for the preparation of such cellulose ethers as are completely or almost completely soluble in caustic alkali solution at room temperature and at a lower temperature, for example at a temperature between room temperature and 0° C. or lower or such cellulose ethers as are insoluble or incompletely soluble in caustic alkali solution at room temperature, but as can be made soluble or completely soluble therein at room temperature by cooling their suspensions or incomplete solutions in caustic alkali solution to a temperature between room temperature and 0° C. or to 0° C. or to a temperature below 0° C., for example to minus 5° C. or to minus 10° C. or lower and then allowing the temperature to rise to 0° C. or above 0° C., for example to room temperature, or such cellulose ethers as are insoluble or incompletely soluble in caustic alkali solution at room temperature or at a temperature between room temperature and 0° C. or even at 0° C., but as can be made partially or completely soluble therein at room temperature and/or at a temperature between room temperature and 0° C. or at 0° C. by cooling their suspensions or incomplete solutions to a temperature below 0° C., for example to minus 5° C. or to minus 10° C. or lower and then allowing the temperature to rise to 0° C. or above 0° C. for example to room temperature.

In other words: In the present invention not only such alkali-soluble cellulose ethers as can be prepared by the processes and methods described in the specifications set forth in the foregoing paragraph, but also such alkali-soluble cellulose ethers may be used as parent materials as can be prepared by any other process or method suitable for the preparation of cellulose ethers which are at least partially soluble in caustic alkali solution or can be made soluble therein by application of low temperatures, for example by the process described in my British Patent No. 212,864.

It is further to be understood that in the present invention either simple or mixed alkali-soluble cellulose ethers can be employed. As mixed ethers the following may be named by way of example:

Cellulose ethers containing in their molecule two different alkyl groups, cellulose ethers containing in their molecule two different hydroxyalkyl groups, cellulose ethers containing in their molecule an alkyl group and a hydroxy-alkyl group, cellulose ethers containing in their molecule two different hydroxy-acid residues, cellulose ethers containing in their molecule an alkyl group and a hydroxy-acid residue, cellulose ethers containing in their molecule a hydroxy-alkyl group and a hydroxy-carboxylic acid residue and so on.

These mixed ethers can be obtained, for example, by treating alkali cellulose simultaneously or in either order with two different alkylating agents, or with an alkylating agent and a hydroxy-alkylating agent, or with two different hydroxy-alkylating agents, or with two different halogen fatty acids, or with an alkylating agent and a halogen fatty acid, or with a hydroxyalkylating agent and a halogen fatty acid, etc., etc. In case of simultaneous treatment, the two different reagents may be added to the alkali cellulose together, for example mixed, or one after the other in either order.

The working up of the cellulose ethers prepared according to the present invention into shaped structures, for example artificial threads, film, coatings of any kind and the like, is effected and treated, for example, by bringing a solution of a cellulose ether prepared and treated in accordance with the invention, into the desired shape and acting upon the shaped solution with a coagulating agent, for example one of the coagulating baths known in the art of making shaped structures from alkali-soluble cellulose derivatives, alkali-soluble cellulose ethers included.

The cellulose ethers prepared according to the present invention may be worked up into shaped structures also in such a manner that their shaped solutions are contacted with an agent or agents which has or have a coagulating effect on the shaped solution and a plasticizing effect on the freshly coagulated material. As agents which exert a coagulating and plasticizing action, baths containing at least 25 per cent. of sulphuric acid monohydrate (for example 25 to about 70 per cent. of sulphuric acid monohydrate), or such a proportion of another strong mineral acid as will produce an effect in the manufacture of shaped structures similar to that given by sulphuric acid containing at least 25 per cent of sulphuric acid, have proved suitable. The coagulating and plasticizing of the solution may also occur in two steps by acting upon the shaped solution first with one or more agents which have a coagulating but no or only little plasticizing effect on the shaped solution and then with one or more agents (for example strong mineral acids, particularly strong sulphuric acid) which have a plasticizing effect on the freshly coagulated material.

As far as supportless shaped structures, such as artificial threads, artificial hair, artificial straw, film bands, strips or the like are concerned, the shaping and coagulating may be effected by extruding the cellulose ether solution through suitably formed openings into a coagulating bath. Supportless shaped structures, such as film or strips or the like may be also produced according to the invention by spreading the cellulose ether solution on a smooth surface which is at least partly immersed in the coagulating bath and thereafter removing the coagulated shaped structure from the said surface and finishing the shaped structure in the usual manner. In case of such shaped structures as are combined with a rigid or pliable support, such as coatings, layers and impregnations of any kind, dressings of fabrics, textile printing, book-cloth, tracing cloth, sizing of yarn, paper-sizing, paper-like surfacing etc. the shaping and coagulating may be accomplished by wholly or partially coating, impregnating, printing or otherwise covering or imbuing with the cellulose ether solution a rigid or pliable support and, with or without intermediate drying, treating the material with a coagulating bath, by either introducing the material into the coagulating bath or by spraying the coagulating bath on the material or conducting the material through a mist of the coagulating bath or by any other method of applying a liquid to a rigid or pliable support.

It must be pointed out expressly that the working up of the cellulose ethers prepared according to the present invention into shaped structures may also be effected according to the process described in my U. S. application Ser. No. 79,199, i. e. by coagulating a shaped solution containing at least one cellulose derivative produced according to the present invention by a medium containing at least one alkali carbonate or according to the process described in my U. S. application Ser. No. 63,280, namely by introducing the shaped solution into water.

Any suitable softening agents, such as glycerine or a glycol or a sugar, such as glucose or a soap or Turkey-red oil, or a drying or non-drying oil, or a halogen derivative of a di- or polyvalent alcohol, particularly a halohydrin, such as a dichlorohydrin or a monochlorohydrin or ethylene chlorohydrin, in short, in so far as it is compatible with the alkali-soluble cellulose ethers, any substance known in the viscose art as addition to viscose may be added to the solutions of the alkali-soluble cellulose ethers prior to their conversion into shaped structures according to the present invention.

Useful parent materials for the production of shaped structures are obtained when the cellulose ethers prepared according to the present invention are xanthated, for example according to the processes described in my U. S. Patents Nos. 2,021,861, 1,858,097 or 1,910,440 or in my U. S. application Ser. No. 521,023.

The xanthates of the cellulose ethers prepared according to the present invention can be produced by acting on the cellulose ethers with carbon bisulphide in presence of alkali. The carbon bisulphide may be caused to act either upon the cellulose ethers in the solid form in presence of caustic alkali solution, for example upon a moist alkali compound of a cellulose ether or upon a mixture of a cellulose ether with caustic alkali solution or upon a suspension of a cellulose ether in caustic alkali solution or upon a solution of a cellulose ether in caustic alkali solution.

The methods of producing xanthates of cellulose derivatives and the working up of such xanthates into shaped structures are in the four aforesaid specifications as well as in my U. S. applications Ser. Nos. 71,250, 71,251, 71,252, 71,253, 71,254, 71,255, 71,260, 71,261, 71,262, 71,263 and 71,264 described and illustrated by examples in so exhaustive a manner that, instead of repeating the said working formulae, I may safely limit myself to referring to the respective parts of the said specifications which will serve as useful descriptions of, and examples for, the conversion into their xanthates of the alkali-soluble cellulose ethers prepared according to the present invention and the working up of the thus obtained xanthates into shaped structures.

It must be pointed out expressly that the working up of the xanthates of the cellulose ethers prepared according to the present invention into shaped structures or other useful articles may also be effected according to the processes described in my U. S. application Ser. No. 90,819 or Ser. No. 90,820.

Any suitable softening agents, such as glycerine or a glycol or a sugar, such as glucose or a soap or Turkey-red oil, or a drying or non-drying oil, or a halogen derivative of a di- or polyvalent alcohol, particularly a halohydrin, such as a dichlorohydrin or a monochlorohydrin or ethylene chlorohydrin may be added to the solutions of the xanthates of the cellulose derivatives produced according to the present invention.

With regard to the carrying out of the present invention in practice, it is impossible to indicate every condition for success in every particular case and it is to be understood that preliminary experiments cannot be avoided to find what are the conditions necessary for success when using a particular kind of cellulose, a particular cellulose ether, a particular temperature and/or duration of the heating operation and/or a particular method of souring.

In order to explain the nature of the present invention, the following specific examples are set forth. It is to be understood that the invention is not limited to these examples, to the precise proportions of ingredients, the times and temperatures and sequence of steps set forth; the parts are by weight:

*Example I*

A. 1000 parts of air-dry wood pulp of a quality and viscosity customary in the viscose art or cotton linters of similar quality are steeped in 10,000 to 20,000 parts of caustic soda solution of 18 per cent. strength at 10° C. and the mixture allowed to stand at 10° C. for 1 to 24 hours. The resulting mass is then pressed at 10° C. to 3000 to 3500 parts and comminuted at 10° C. for 1 to 3 hours in a Werner-Pfleiderer shredder or another suitable comminuting machine or in a Werner-Pfleiderer xanthating machine whose blades may be dentated, whereafter the shredded alkali cellulose is allowed to mature for 72 hours at 10° C. Thereupon 200 parts of ethylene chlorohydrin or 110 parts of ethylene oxide are added in one or several portions and the reaction mass is shredded for about 3 hours at 10° C.

Thereafter the crude reaction mass as such or after having been neutralised or acidified is washed with water and then pressed and dried at 100° C. for about 12 to 20 hours. Thereupon, optionally after having been comminuted or ground, the dried hydroxy-ethyl cellulose is placed in a closed vessel and, optionally with stirring or kneading or otherwise agitating (for example in an autoclave which may be provided with a stirring device or which may be a rotating autoclave or in a kneading machine provided with a well fitting lid), heated to about 100° C. and kept at this temperature for 12 to 24 hours.

Whilst a slowly filterable solution in caustic soda solution of, say, 8 to 9 per cent. strength of the parent hydroxy-ethyl cellulose can be obtained only by cooling its suspension or incomplete solution in caustic soda solution to minus 5° C. or preferably to minus 10° C. and allowing the temperature to rise to room temperature, the product of this example readily dissolves in caustic soda solution of 8 to 9 per cent. strength at about 0° C., the thus obtained solution remaining perfectly liquid at room temperature also.

In addition, whereas the viscosity of a solution containing 7 per cent. of the parent hydroxy-ethyl cellulose and 9 per cent. of NaOH is 25 to 28 as compared with glycerine of 1.26 specific gravity, and whereas this solution filters only at a pressure of about 10 atmospheres and also this very slowly (the cotton used for filtration must be changed 20 to 30 times), the viscosity of a solution containing 7 per cent. of the product of this example and 9 per cent. of NaOH is about 8 to 9 as compared with glycerine of 1.26 specific gravity and the solution filters very well at a pressure of about 4 to 2 atmospheres and without any changes or with only a few changes of the cotton. From the solution of the heat treated product of this example it is possible to obtain films which have a dry tenacity of 13000 grammes (13 kilogrammes) per square millimetre, a wet tenacity of 3000 grammes (3 kilogrammes) per square millimetre, a dry extensibility of 24 per cent. and a wet extensibility of 105 to 110 per cent.

B. The process is conducted as in A, but with the variation that, before being dried, the parent hydroxy-ethyl cellulose is, by treating it once or several times with alcohol of 96 to 100 per cent. strength, partly or wholly dehydrated and, optionally thereafter exhausted with ether.

C. The process is conducted as in A or B, but with the exception that the heating operation takes place in absence of air or in presence of a reduced quantity of air, for example in a vacuum of 10 to 18 millimetres or in a hydrogen- or nitrogen- or carbon dioxide atmosphere.

D. 100 grams of product of A or B or C are well mixed with about 3 litres of hydrochloric acid of 0.5 per cent. strength and the thus obtained mixture allowed to stand at room temperature for 2 hours, whereupon the so treated product of A or B or C is separated from the acid on a filter or on a straining cloth or in a filter press or in a centrifuge and washed with water until free from acid. The washed product is then pressed and, after the water content of the pressed product has been determined, dissolved by mixing it at 0° C. or at 5° C. or at 15° C. with so much caustic soda solution of appropriate strength as to yield a mixture containing about 7 per cent. of the modified hydroxy-ethyl cellulose and 7 to 10 per cent of caustic soda.

The washed and pressed reaction mass may also, optionally after having been dehydrated with alcohol and, if desired, exhausted with ether, be dried and thereafter dissolved as described above.

A solution containing 7 per cent. of the modified hydroxy-ethyl cellulose and 9 per cent. of NaOH has a viscosity of 6.5 to 7 as compared with glycerine of 1.26 specific gravity. It filters well at a pressure of 4 to 2 atmospheres without change or with a very few changes of the filtering material (cotton). It is possible to obtain from the solution films which have a dry tenacity of 13700 grammes (13.7 kilogrammes) per square millimetre, a wet tenacity of 3550 grammes (3.55 kilogrammes) per square millimetre, a dry extensibility of 24 and a wet extensibility of 115 to 120 per cent.

E. Mode of procedure as in D, but with the variation that, instead of the hydrochloric acid of 0.5 per cent. strength, hydrochloric acid of 1 to 5 per cent. strength is used.

Example II

The process is carried out as in Example I A or B or C or D or E, but with the difference that, instead of at 100° C., the heating is conducted at 105° C.

In each of the five cases the product is readily soluble in caustic soda solution at room temperature, the viscosity of a solution containing 7 per cent. of the modified hydroxy-ethyl cellulose and 9 per cent. of caustic soda being, when one of the working formulae of Example I A or B or C is followed, about 6 and, when Example I D or E is followed, 5 to 5.5 as compared with glycerine of 1.26 specific gravity. From the solutions which are easily filterable at a pressure of 4 to 2 atmospheres shaped structures can be produced which have highly satisfactory dynamometric properties.

Example III

The process is conducted as in Example I A or B or C or D or E, but with the difference that, instead of 100° C., the temperature of the heating operation is 110° C.

The properties of the final product and of the shaped structures prepared therefrom are similar to the properties of the product of Example II and of the shaped structures made therefrom.

Example IV

Mode of procedure as in Example I A or B or C or D or E, but with the exception that, instead of at 100° C., the heating is conducted at 120° C.

The resultant body is readily soluble in caustic soda solution, for example of 7 to 9 per cent. strength, at room temperature (15 to 16° C.). A solution containing 7 per cent. of the modified hydroxy-ethyl cellulose and 9 per cent. of NaOH filters very well at a pressure of 4 to 2 atmospheres and has a viscosity of 2.8 as compared with glycerine of 1.26 specific gravity, the viscosity of a solution (made up in the same proportions) from the parent hydroxy-ethyl cellulose prepared by freezing and thawing being 25 to 28 and its filtering capacity considerably inferior (10 to 8 atmospheres). Notwithstanding the lower viscosity, the solution gives shaped structures having very good dynamometric properties. Thus, for instance films can be obtained that have a dry tenacity of 13,600 grammes per square millimetre, a wet tenacity of 2350 grammes per square millimetre and an extensibility of 16 to 20 per cent.

Example V

The process is conducted as in Example IV, but with the exception that the duration of the heating is 3 hours 30 minutes instead of 12 hours.

Example VI

The process is conducted as in any one of the preceding examples, but with the difference that, after the three hours' shredding taking place in Example I A after the addition of the ethylene chlorohydrin or ethylene oxide, before being washed, the reaction mass is allowed to remain at 10° C. for 21 hours.

When this example leans on either of the working formulae given in the Example I A or B, the resultant product is readily soluble in caustic soda solution of, say, 8 to 9 per cent. strength at 15° C., giving thereby an easily filterable solution (4 to 2 atmospheres) from which shaped structures having excellent dynamometric properties can be obtained (e. g. films having a dry tenacity of about 11,400 and a wet tenacity of 2700 grammes per square millimetre and an extensibility of 24 to 26 per cent.), whereas the parent hydroxy-ethyl cellulose is insoluble at 15° C. and can be brought into solution only according to the process described in my British Patent No. 212,864, for example by cooling its incomplete solution to 0° C. or minus 4° C. or lower.

And, when the working formula given in Example I D is adopted for this example, products having the same solubility and filterability result, from which it is possible to obtain shaped structures excelling by still better dynamometric properties (e. g. films having a dry tenacity of 12,000 grammes, a wet tenacity of 3000 grammes per square millimetre and an extensibility of 20 to 27 per cent.

In contradistinction to the products of this example, the parent hydroxy-ethyl cellulose is insoluble at 15° C. and can be brought into solution only according to the process described in my British Patent No. 212,864, for example by cooling its incomplete solution to 0° C. or minus 4° C. or lower.

Example VII

The process is conducted as in any one of the Examples I to V, but with the exception that, after the three hours' shredding taking place in Example I A after the addition of the ethylene chlorohydrin or ethylene oxide, before being washed, the reaction mass is allowed to remain at 21° C. for 21 hours.

*Example VIII*

The process is carried out as in any one of the Examples I to V, but with the difference that the 3 hours' shredding taking place in Example I A after the addition of the ethylene chlorohydrin or ethylene oxide is conducted at 21° C. instead of at 10° C.

*Example IX*

The process is conducted as in any one of the Examples I to V, but with the difference that the 1 to 3 hours' shredding occurring in Example I A before, and the 3 hours' shredding occurring in Example I A after the addition of the ethylene chlorohydrin or ethylene oxide is performed at 21° C. instead of at 10° C.

Regardless of whether this example leans on any one of the working formulae of the Examples I A to C, or on the working formula of Example I D, the filterability of the solution is perfectly satisfactory and the dynamometric properties of the shaped structures made from the final products are very good.

*Example X*

The process is conducted as in any one of the Examples I to V, but with the exception that the 1 to 3 hours' shredding before, and the 3 hours' shredding in Example I A after the addition of the ethylene chlorohydrin or ethylene oxide is performed at 21° C. instead of at 10° C., and that after the 3 hours' shredding which in Example I A occurs after the addition of the ethylene chlorohydrin or ethylene oxide, before being washed, the reaction mixture is allowed to stand at 21° C. for 21 hours.

When in this example either of the working formulae given in the Example I A or B is followed, a product is obtained which is readily soluble in caustic soda solution of, say, 8 to 9 per cent. strength at 15° C. The solutions thus obtained (for example a solution containing 7 per cent. of the modified hydroxy-ethyl cellulose and 9 per cent. of NaOH) filter easily at a pressure of 3 to 2 atmospheres. Still better filterable solutions can be obtained when the product is after-treated according to Example I D. For, a solution of such after-treated, modified hydroxy-ethyl cellulose filters easily at a pressure of 2 atmospheres, and the shaped structures which can be prepared therefrom have very good dynamometric properties. Thus, for example, films produced therefrom reach a dry tenacity of 11,000 grammes and a wet tenacity of 2500 grammes per square millimetre, a dry extensibility of about 30 to 34 and a wet extensibility of about 110 per cent.

In contrast with the products of this example, the parent hydroxy-ethyl cellulose used therein is insoluble in caustic soda solution at 15° C. and can be made soluble therein only by cooling its suspension or incomplete solution in caustic soda solution to a low temperature according to the process of my British Patent 212,864, the solution thus obtained being only slowly filterable (6 to 4 atmospheres). In addition, the viscosity of a solution of the parent hydroxy-ethyl cellulose containing 7 per cent. of the latter and 9 per cent. of NaOH is 10 to 11, whilst the viscosity of an equally composed solution of the product of this example prepared in accordance with Example I A or B is about 7 and the viscosity of an equally composed solution of the product of this example made according to Example I D is about 4 to 5 as compared with glycerine of 1.26 specific gravity.

*Example XI*

Mode of procedure as in Example X, but with the variation that the duration of the heating of the dried hydroxy-ethyl cellulose at 100° C. is one hour instead of twelve hours.

The properties of the products thus obtained are similar to the properties of the products of Example X, the only difference being that the former are difficultly soluble in caustic soda solution at 15° C., but readily soluble therein at 10° C., the filterability of the solutions and the dynamometric properties of shaped structures made therefrom leaving nothing to be desired.

*Example XII*

The process is carried out as in any one of the Examples I to V, but with the difference that, instead of at 10° C., the shredding of the alkali cellulose, the maturing of the alkali cellulose and the shredding after the addition of the ethylene chlorohydrin or ethylene oxide are conducted at 15° C.

Both, the product of the treatment of the hydroxy-ethyl cellulose thus obtained according to Example I A or B and the product of the after-treatment of the so modified hydroxy-ethyl cellulose according to Example I D, are readily soluble in caustic soda solution at 15° C., the solutions thus produced being easily filterable (the former solution at a pressure of 3 to 4 atmospheres and the latter at a pressure of 3 atmospheres). In contradistinction to this, the parent hydroxy-ethyl cellulose of this example is incompletely soluble in caustic alkali solution at 15° C. and can be made soluble therein only by refrigeration according to the process described in my British Patent No. 212,864, the solutions thus obtained being difficultly filterable (10 to 8 atmospheres) and more viscous than the solutions of the hydroxy-ethyl cellulose modified according to the present example.

The dynamometric properties of the shaped structures made from products of the present example are very satisfactory.

*Example XIII*

The process is carried out as in Example XII, but with the difference that the shredding after the addition of the ethylene chlorohydrin or ethylene oxide is performed at 21° C. instead of at 15° C.

The products of the treatment of the hydroxy-ethyl cellulose according to Example I A or B and the product of the after-treatment with hydrochloric acid according to Example I D are soluble in caustic soda solution at 15° C., the solution of the soured product being very easily filterable at a pressure of 2 atmospheres. From this solution shaped structures with very good dynamometric properties can be obtained. Thus, for instance, it is possible to produce films therefrom which have a dry tenacity of about 11,400 grammes per square millimetre, a wet tenacity of about 2600 grammes per square millimetre, a dry extensibility of about 30 to 35 and a wet extensibility of about 140 per cent.

All this is the more remarkable, since the parent hydroxy-ethyl cellulose used in this example is incompletely soluble in caustic soda solution at 15° C. and can be completely dissolved therein only by the refrigeration process described in my British Patent No. 212,864.

Example XIV

The process is conducted as in Example XIII, but with the variation that the duration of the heating operation is only 1 hour instead of 12 hours.

In contrast with the product of Example XIII, the product of this example is not absolutely completely soluble in caustic soda solution at room temperature, but only at about 0 to 5° C. Its solutions however are easily filterable and capable of yielding shaped structures having very good dynamometric properties.

Example XV

The process is conducted as in Example XIII, but with the exception that the shredding after the addition of the ethylene chlorohydrin or ethylene oxide takes place at 21° C., and that thereafter the reaction mass is allowed to stand at 21° C. for 21 hours.

Example XVI

The process is conducted as in any one of the Examples I to V, but with the difference that, instead of at 10° C., the shredding of the alkali cellulose and the maturing of the alkali cellulose are carried out at 25° C., and that the shredding after the addition of the ethylene chlorohydrin or ethylene oxide is carried out at 21° C.

The products of this example are readily soluble in caustic soda solution at room temperature, the solutions having low viscosities. Thus, for instance, a solution of the product obtained in accordance with the working formula of Example I A or B containing 7 per cent. of the modified hydroxy-ethyl cellulose and 9 per cent. of NaOH has a viscosity of 1.7 to 2 as compared with glycerine of 1.26 specific gravity and an equally composed solution of the product prepared on the basis of Example I D a viscosity of 1.3 to 1.75 as compared with glycerine of 1.26 specific gravity. They filter very easily at a pressure of 2 atmospheres.

Nevertheless, it is possible to produce from these solutions shaped structures having very good dynamometric properties (for example, films having a dry tenacity of 10,600 grammes, a wet tenacity of 2300 grammes, a dry extensibility of about 23 per cent. and a wet extensibility of about 105 per cent.).

Example XVII

The process is carried out as in Example XVI, but with the variation that the shredding after the addition of the ethylene chlorohydrin or ethylene oxide is conducted at 25° C. instead of at 21° C.

Example XVIII

The process is conducted as in Example XVI, but with the exception that, after the shredding following the addition of the ethylene chlorohydrin or ethylene oxide, the mass is allowed to remain at 21° C. for 21 hours.

Example XIX

The process is conducted as in any one of the Examples X to XVIII, but with the difference that the temperature of the heating operation is 50° C. instead of 100 or 105° C. This notwithstanding, the products (particularly the products after-treated in the sense of Example I D) are readily soluble in caustic soda solution at 15° C., thus giving easily filterable (about 4 to 2 atmospheres) solutions which are capable of being converted into shaped structures having very good dynamometric properties.

Example XX

The process is conducted as in any one of the Examples I to V, but with the difference that the duration of the maturing of the alkali cellulose is 144 hours instead of 72 hours.

Example XXI

The process is carried out as in any one of the Examples I to V, but with the following differences:

(a) The shredding of the alkali cellulose is performed at 15° C. instead of at 10° C.

(b) The temperature of the maturing of the alkali cellulose is 18° C. instead of 10° C.

(c) The duration of the maturing of the alkali cellulose is 36 hours instead of 72 hours.

The straight products of this example as well as the products soured according to Example I D are readily soluble in caustic soda solution at 15° C., the thus obtained solutions being easily filterable at 4 to 2 atmospheres and convertible into shaped structures having very good dynamometric properties. Also in this case it can be observed that the modified hydroxy-ethyl cellulose obtained in this example when after-treated with acid according to Example I D gives shaped structures which, with regard to their dynamometric properties, are somewhat superior to the shaped structures prepared from the modified hydroxy-ethyl cellulose which has not been so after-treated.

Example XXII

The process is carried out as in Example XXI, but with the difference that the shredding after the addition of the ethylene chlorohydrin or ethylene oxide is conducted at 21° C., and that thereafter the reaction mass is allowed to stand at 18° C. for 21 hours.

Example XXIII

The process is carried out as in Example XXI, but with the exception that the duration of the maturing of the alkali cellulose is 48 hours instead of 36 hours and that the 3 hours' shredding after the addition of the ethylene chlorohydrin or ethylene oxide is conducted at 20° C. instead of at 10° C.

Example XXIV

The process is conducted as in any one of the foregoing examples, but with the difference that, instead of the 200 parts of ethylene chlorohydrin or 110 parts of ethylene oxide, 275 parts of glycerine-alpha-monochlorohydrin or 250 parts of propylene chlorohydrin or 145 to 150 parts of propylene oxide or 200 to 300 parts of di-ethyl sulphate or 200 to 250 parts of di-methyl sulphate or 230 to 240 parts of monochloroacetic acid, preferably in the form of a strong solution of its sodium salt, are used.

Example XXV

The process is conducted as in any one of the foregoing Examples I to XXIII, but with the exception that, instead of the 200 parts of ethylene chlorohydrin or 110 parts of ethylene oxide, a mixture of 100 parts of ethylene chlorohydrin or of 55 parts of ethylene oxide and 100 to 200 parts of di-methyl sulphate or di-ethyl sulphate or a mixture of 50 parts of ethylene chlorohydrin or of 27.5 parts of ethylene oxide and 50 to 200 parts of di-methyl sulphate or di-ethyl sulphate is used.

Example XXVI

The process is conducted as in any one of the Examples I to XXIII, but with the difference that, instead of the 200 parts of ethylene chlorohydrin or 110 parts of ethylene oxide, 100 to 110 parts of ethylene chlorohydrin or 55 to 60 parts of ethylene oxide are used.

The modified hydroxy-ethyl cellulose thus obtained is as such or after having been treated with acid according to Example I D only incompletely soluble in caustic soda solution at room temperature. Nevertheless, the viscosity of its solutions is much lower than the viscosity of the solutions of the parent hydroxy-ethyl cellulose. For example: A solution containing 7 per cent. of the parent hydroxy-ethyl cellulose and 9 per cent. of NaOH has a viscosity of 25.9 as compared with glycerine of 1.26 specific gravity, whereas the viscosity of an equally composed solution of the non-soured, modified hydroxy-ethyl cellulose prepared according to this example is 8.4 and the viscosity of the hydroxy-ethyl cellulose modified according to this example and after-treated with hydrochloric acid in the sense of Example I D is 4.7 as compared with glycerine of 1.26 specific gravity.

In addition, the filterability of the solutions of the products of the present example is far better than the filterability of the solutions of the parent hydroxy-ethyl cellulose, a 7 per cent. solution of the former filtering easily at 6 to 4 (non-soured product) or at 4 to 3 atmospheres (soured product), a 6 per cent. solution of the latter filtering very slowly and with several changes of the cotton at 10 to 8 atmospheres.

The shaped structures obtainable from the solutions of the hydroxy-ethyl cellulose modified according to this example, have very good dynamometric properties.

Example XXVII

The process is carried out as in Example XXVI, but with the exception that the shredding of the alkali cellulose, the maturing of the alkali cellulose and the shredding after the addition of the ethylene chlorohydrin or ethylene oxide is conducted at 21° C. instead of at 10° C. and that thereafter the reaction mass is allowed to remain at 21° C. for 21 hours.

The modified hydroxy-ethyl cellulose resulting from this example is as such and in the soured state (see, for instance, Example I D) readily soluble in caustic soda solution at 0° C. to 5° C., the thus obtained solutions displaying excellent filterability. Shaped structures produced therefrom have very good dynamometric properties.

Example XXVIII

The process is conducted as in any one of the Examples I to V, but with the following differences:

(a) The temperature of the shredding preceding the addition of the ethylene chlorohydrin or ethylene oxide is 20° C. instead of 10° C.

(b) Instead of the 200 parts of ethylene chlorohydrin or 110 parts of ethylene oxide, 100 to 110 parts of ethylene chlorohydrin or 55 to 60 parts of ethylene oxide, are used.

(c) The 3 hours' shredding following the addition of the ethylene chlorohydrin or ethylene oxide is carried out at 20° C. instead of at 10° C.

(d) After this shredding the reaction mass is allowed to stand at 20° C. for 15 hours and then washed.

The resultant product is as such or after having been treated with hydrochloric acid according to Example I D readily soluble in caustic soda solution at 0° C., giving solutions which are easily filterable at a pressure of 3 to 2 atmospheres, which solutions are capable of being worked up into shaped structures having very good dynamometric properties. When the heating is conducted at 120° C., the product of this example is soluble in caustic soda solution at 15° C.

Example XXIX

The process is carried out as in Example XXVIII, but with the difference that, instead of for 15 hours, the reaction mass resultant from the shredding after the addition of the ethylene chlorohydrin or ethylene oxide is allowed to remain at 20° C. for 24 or 36 or 48 hours.

The properties of the modified hydroxy-ethyl celluloses prepared according to this example are similar to the products of Example XXVIII, the filterability of the solutions being still better than in Example XXVIII. The viscosity is in an inverse proportion to the time of the after-maturing. When the duration of the after-maturing is 24 hours, the soured product is soluble at 0° C., whereas, when the duration of the after-maturing is 36 to 48 hours, both, the soured and unsoured product are soluble at plus 10° C.

Example XXX

The process is conducted as in Example XXVIII, but with the difference that, instead of for 15 hours, the reaction mass resultant from the shredding after the addition of the ethylene chlorohydrin or ethylene oxide is allowed to remain at 20° C. for 64 hours.

The non-soured and the soured product of this example are readily soluble in caustic soda solution at 10° C., giving solutions which are very easily filterable at a pressure of 2 atmospheres. It is possible to obtain therefrom shaped structures having very good dynamometric properties.

Example XXXI

The process is carried out as in any one of the Examples XXVIII to XXX, but with the exception that, before being treated with the ethylene chlorohydrin or ethylene oxide, the alkali cellulose is allowed to mature for 64 hours at 21° C.

The cellulose ethers used as parent materials in the foregoing examples may in the form of the crude reaction masses (when necessary with addition of some concentrated caustic alkali solution or solid caustic alkali in replacement of, or in excess to, the caustic alkali used up in the reaction) or in the form of the washed and, optionally dried, reaction products be treated in presence of alkali with 50 to 200 parts of ethyl chloride or with 70 to 150 parts of propyl chloride or 100 to 600 parts of benzyl chloride at 50 to 110° C. and used as starting materials in the present invention, for example as described in any one of the Examples I to XXXI.

Example XXXII

The process is conducted as in any one of the Examples I to V, but with the difference that, instead of the hydroxy-ethyl cellulose used therein as parent material, an ethyl cellulose is used which, for example, may be prepared as follows:

A quantity of any one of the alkali celluloses used for the etherification in any one of the preceding examples, corresponding to 1000 parts of air-dry parent cellulose is placed in a rotating autoclave or an autoclave provided with a stirring device, 200 to 500 parts of pre-cooled ethyl chloride are added, and the material is heated to 60 to 80° C. and kept at this temperature for 12 hours.

The product of the reaction is washed, and thereafter dried and treated as described in any one of the Examples I to V.

Any one of the ethyl celluloses obtained in Example XXXII may be hydroxy-alkylated in the following manner:

The NaOH content of the crude reaction mixture resulting from the ethylating operation is determined by analysis, whereupon, optionally after compensating the amount of NaOH used up in the alkylating reaction by supplying to the reaction mixture the equivalent or a larger quantity of NaOH in the form of powder or of a strong solution, for instance of 30 to 50 per cent. strength, the reaction mixture is treated with 50 to 150 parts of ethylene chlorohydrin or 70 to 210 parts of glycerol alpha-monochlorohydrin or with 25 to 75 parts of ethylene oxide or with 32 to 100 parts of propylene oxide as described in any one of the preceding relative examples for alkali cellulose.

The thus obtained ethyl-hydroxy-ethyl cellulose or ethyl-1:2-dihydroxy-propyl cellulose or ethyl-hydroxy-propyl cellulose is washed and thereafter dried and treated as described in any one of the Examples I to V.

Example XXXIII

The process is conducted as in any one of the preceding examples, but with the variation that the heating operation is conducted at about 130 or at about 140° C. Many cellulose ethers modified according to the present example, even if prepared with the lower limits of the etherifying agents given in the preceding examples, for instance with 100 to 110 parts of ethylene chlorohydrin or 55 to 60 parts of ethylene oxide are soluble at plus 15° C. and higher.

Example XXXIV

The process is conducted as in any one of the preceding examples, but with the difference that the dry cellulose ether is heated for 3 hours at 150° C. instead of for 12 to 24 hours at 100 or 105 or 110 or 120° C.

Example XXXV

The process is conducted as in Example XXVI, but with the difference that the dry hydroxyethyl cellulose is heated for 1 to 2 hours at 180° C. instead of for 3 hours at 150° C.

As stated above, the cellulose ethers prepared according to the present invention can be converted into technically valuable xanthates. These xanthates can be produced for example according to any one of the processes described in my U. S. Patents Nos. 2,021,361, 1,858,097 and 1,910,440 and in my U. S. applications Ser. Nos. 521,023, 521,017, 71,250, 71,251, 71,252, 71,253, 71,254, 71,255, 71,260, 71,261, 71,262, 71,263 and 71,264.

In this respect, special attention is called by way of example to the seven methods described in my U. S. Patent No. 1,858,097, to the nine methods described in each of my U. S. applications Ser. Nos. 71,250, 71,251, 71,252 and 71,253, and to the nine methods given in my U. S. application Ser. No. 71,263 and to the examples contained in these specifications.

The cellulose ethers prepared according to the present invention are particularly suitable parent materials for the preparation of cellulose ether xanthates by means of small proportions of carbon bisulphide according to the process described in my co-pending application Ser. No. 71,263.

The xanthates of the cellulose ethers prepared according to the present process can be worked up into shaped structures excelling by very valuable properties.

Since the practice of the process of making xanthates of cellulose ethers and of working them up into shaped structures is exactly as set forth in the specifications set out in the foregoing paragraphs and explained therein by aid of numerous examples, it appears superfluous to repeat here all particulars relating to the conversion of the cellulose ethers prepared according to the invention into their xanthates and to the working up of these xanthates into shaped structures and other useful articles under various working conditions.

I therefore limit myself to the following examples:

Example XXXVI

An alkali-soluble, water-insoluble cellulose ether prepared according to any one of the foregoing examples is converted into its alkali compound either by alkalizing it with an excess of caustic soda solution of 18 to 20 per cent. strength and removing the excess of the caustic soda solution by pressing and thereafter shredding the sodium cellulose ether thus obtained or by mixing in a shredder 1 part of the dry cellulose ether with 2 to 2.5 parts by weight of caustic soda solution of 18 to 20 per cent. strength.

The sodium cellulose ether obtained according to either of the aforementioned two methods is, optionally after having been matured for 12 to 48 hours or longer, treated with 30 to 60 per cent. of carbon bisulphide (based on the weight of the cellulose ether) according to the process described in my U. S. Patent No. 1,858,097 or in my U. S. application Ser. No. 521,023 or with 8 to 12 per cent. of carbon bisulphide according to the process described in my U. S. application Ser. No. 71,263, whereupon the thus obtained cellulose ether xanthate is dissolved in so much caustic soda solution of appropriate strength as to yield a solution containing 7 to 10 per cent. of the cellulose ether (calculated as dry substance) in a caustic soda solution of 6 to 9 per cent. strength.

The thus obtained solution can be worked up into shaped structures according to any method described in my U. S. applications Ser. Nos. 71,250, 71,251, 71,252, 71,253, 71,263 or 521,017 or in my U. S. Patent No. 2,021,861.

Example XXXVII 1000 parts of air-dry wood-pulp of a quality and viscosity customary in the viscose art or cotton linters of similar quality are steeped in 10,000 to 20,000 parts of caustic soda solution of 5 per cent. strength at 15° C. and the mixture allowed to stand at 15° C. for 3 to 24 hours. The resulting mass is then pressed to 1340 parts and comminuted at 15° C. for 3 hours in a Werner-Pfleiderer shredder. Thereupon the alkali cellulose thus obtained is dried under reduced atmospheric pressure at 60° C. to constant weight and thereafter treated in a rotating autoclave with 100 parts of ethyl chloride at 95° C. for 12 hours.

The crude product of the reaction is then washed and, optionally after having been comminuted and sieved, dried at 100° C. for 12 hours and then heated in a rotating autoclave at 100° C. for 12 hours.

After that time, the modified ethyl cellulose thus obtained is alkalized and xanthated as described in the foregoing example.

*Example XXXVIII*

The process is conducted as in Example XXXVII, but with the difference that the steeping caustic soda solution is a caustic soda solution of 2 per cent. strength and that the alkali cellulose is pressed to 2000 parts instead of to 1340 parts.

Instead of being prepared by steeping the cellulose in an excess of caustic alkali solution and removing the excess by pressing, in any one of the preceding examples, the alkali cellulose may be prepared by mixing the cellulose in a suitable mixing apparatus, for example a shredder or a kneading machine or a mill or a disintegrator or an edge runner or the like with the amount of caustic soda solution corresponding with the quantity remaining in the alkali cellulose used in the relative examples after pressing (for example with 2000 to 2500 parts of caustic soda solution of 18 per cent. strength). The mixing of the cellulose with the caustic alkali solution may be conducted at room temperature or at a temperature above room temperature, for example at 24 to 30° C., or with cooling, for example to 15° or 10° C. or lower. The time of mixing may be varied within wide limits, for example from 1 hour to 24 hours or longer.

As a guiding line with regard to the question whether or not the alkali cellulose should be allowed to mature before being brought together with the etherifying agent or agents, may, among others, serve the desired viscosity of the final solution of the products of the invention in the production of which alkali cellulose is used, i. e. of the solution of the modified cellulose ether which is to be worked up into shaped structures, and in connection therewith the viscosity of the kind of cellulose used as starting material for making the cellulose ether. If it is desired to give the solution a definite viscosity, then the alkali cellulose produced from the kind of cellulose contemplated is subjected to a maturing process, if without maturing this kind of cellulose yields a higher viscosity. If, however (in a preliminary experiment), the solution exhibits from the first the desired grade of viscosity, that is without maturing, the maturing is superfluous. Now, as the viscosities of the different kinds of cellulose on the market (linters and wood-pulp) differ very much from one another, the question of maturing depends in most cases on the one hand on the viscosity desired of the solution intended for the manufacture of shaped structures, and on the other hand on the viscosity of the kind of cellulose used as starting material.

In the foregoing examples, any excess of the volatile (if any) etherifying agents which has not been used up in the etherifying reaction may be recovered by condensation or distillation.

In the foregoing examples, instead of cellulose, a conversion product of cellulose—for instance, a cellulose hydrate or a hydrocellulose produced by chemical action on cellulose, such as mercerisation with subsequent washing and, if desired, drying; or by treating with a strong inorganic or organic acid or a mixture of both; or by treating with a dilute solution of a mineral acid; or by treatment with a zinc halide; or by a mechanical process, such as grinding in presence of water or the like; or an oxycellulose—in short any body of the cellulose group which has been proposed for the manufacture of viscose or of any other cellulose derivatives or compounds or of ammoniacal-copper-oxide cellulose can be used as starting material for the production of the cellulose ether.

If feasible or expedient, in the foregoing examples, instead of the chlorinated etherifying agents used therein, equivalent quantities of the corresponding brominated or iodinated reagents (for example alkyl bromides or alkyl iodides or monobromohydrin or monoiodohydrin or ethylene bromohydrin or ethylene iodohydrin or bromo-acetic acid or iodo-acetic acid etc.) may be used.

If feasible or expedient, in the foregoing examples, instead of the alkylating or hydroxyalkylating agents used therein, equivalent quantities of alkylating or hydroxy-alkylating agents containing other alkyl or hydroxy-alkyl groups can be used, for instance methyl chloride or propyl chloride or an amyl chloride or a butyl chloride or butylene chlorohydrin.

If feasible or expedient, instead of ethylene oxide or propylene oxide, other alkylene oxides, such as butylene oxide or glycide, in short all suitable compounds which contain an ethylene oxide ring can be used in the foregoing examples.

If feasible or expedient, instead of alkyl halides or di-alkyl sulphates, equimolecular amounts of their substitution or addition derivatives, for example halogen alkyl amines, such as halogen alkyl-dialkyl amines or their hydrochlorides can be employed in the foregoing examples.

If feasible or expedient, in the foregoing relative examples, instead of the chloroacetic acid, the equimolecular quantity of an ester of chloroacetic acid, for example methyl- or ethyl-chloroacetate or a halogen derivative of a homologue of acetic acid, for instance alpha-chloropropionic acid or alpha-isobutyric acid or alpha-bromopropionic acid or alpha-bromo-isobutyric acid or the like or an alkali salt or an ester thereof may be employed.

As stated above, the solutions of the cellulose ethers prepared according to the invention may be worked up into shaped structures or other useful articles by any process whatever known or proposed for the manufacture of shaped structures or other useful articles from alkali-soluble cellulose derivatives, viscose included, for instance by the process described in my U. S. Patent No. 1,722,928 or by any one of the processes described in my U. S. applications Ser. Nos. 521,022, 71,250, 71,251, 71,252, 71,253, 71,254, 71,255, 71,260, 71,261, 71,262 and 91,790, or by the processes described in my U. S. applications Ser. Nos. 63,280 and 79,199.

The directions given in those specifications for the production of shaped structures from alkali-soluble cellulose ethers in general and from alkali-soluble hydroxy-alkyl ethers of cellulose in particular are so thorough and detailed and, in addition, illustrated by so many examples that, instead of repeating the descriptions and statements in question, I prefer to confine myself to a reference to the said specifications.

With regard to the processes or methods for the conversion into shaped structures of the xanthates of the cellulose ethers prepared according to the invention, special attention is called by way of example to the processes of my U. S. applications Ser. Nos. 90,819 and 90,820 which, when applied to the xanthates of the present cellulose ethers, yield excellent shaped structures, at the same time economizing their production.

If desired, the extensibility of the shaped structures, such as threads or film or coatings or the like produced according to the present invention from the straight cellulose ethers or from their xanthates may be increased by treating them either in the course of their manufacture, for example after coagulation and washing or in the finished wet or dry state with suitable shrinking agents, for example, with some of the shrinking agents mentioned in my U. S. Patents Nos. 1,989,098, 1,989,100, 1,989,101, 2,001,621, 2,004,875 and 2,004,876.

In the specification and claims, wherever the context permits, the expressions "alkali-soluble cellulose ether," "cellulose ether which is soluble or at least partially soluble in caustic alkali solution" and "cellulose ether which is at least partially soluble in caustic alkali solution" are intended to include such simple and mixed cellulose ethers and such cellulose ether-esters as are completely or almost completely soluble in caustic alkali solution at room temperature and at a lower temperature, for example at a temperature between room temperature and 0° C. or lower and such simple and mixed cellulose ethers and such cellulose ether-esters as are insoluble or incompletely soluble in caustic alkali solution at room temperature, but as can be made soluble or completely soluble therein at room temperature by cooling their suspensions or incomplete solutions in caustic alkali solution to a temperature between room temperature and 0° C. or to 0° C. or to a temperature below 0° C., for example to minus 5° C. or to minus 10° C. or lower and then allowing the temperature to rise to 0° C. or above 0° C., for example to a temperature between 0° C. and 20° C., and such simple or mixed cellulose ethers and such cellulose ether-esters as are insoluble or incompletely soluble in caustic alkali solution at room temperature or at a temperature between room temperature and 0° C. or even at 0° C., but as can be made partially or completely soluble therein at room temperature and/or at a temperature between room temperature and 0° C. or at 0° C. by cooling their suspensions or incomplete solutions to a temperature below 0° C., for example to minus 5° C. or minus 10° C. or lower and then allowing the temperature to rise to 0° C. or above 0° C., for example to room temperature.

The term "cellulose" used in the description and claims is, wherever the context permits, intended to include cellulose, its conversion and oxidation products, such as cellulose hydrate, hydrocellulose, oxycellulose, acidcellulose and the like, in short, any body of the cellulose group which has been proposed as starting material for the preparation of cellulose derivatives or cellulose compounds of any kind.

Wherever the context permits, the term "alkali cellulose" means alkali cellulose prepared in the usual manner, namely by steeping cellulose in caustic alkali solution and removing the excess of the latter by pressing, or by mixing cellulose with such an amount of caustic alkali solution as is desired to be present in the final alkali cellulose.

The expression "etherification" used in the specification and claims covers alkylation or aralkylation or hydroxy-alkylation or production of hydroxy-acid derivatives, "ether" covers simple alkyl or aralkyl and hydroxy-alkyl or hydroxy-acid ethers and also mixed ethers, for example the mixed ethers hereinbefore named.

The term "hydroxy-alkyl" is intended to include the halogenated or non-halogenated radicals of di- or poly-valent alcohols in conjunction with one or more oxygens or hydroxyls.

Wherever the context permits, the terms "alkyl," "alkylate," "alkylating agent," "alkylation" are intended to include unsubstituted or substituted (for example aralkyl groups) alkyl groups, alkylate with alkylating agents that contain unsubstituted or substituted (for example aralkyl groups) alkyl groups, alkylating agents that contain unsubstituted or substituted (for example aralkyl groups) alkyl groups, alkylation with alkylating agents that contain unsubstituted or substituted (for example aralkyl groups) alkyl groups.

The term "hydroxy-alkylating agents" is intended to include halogen derivatives of di- or polyhydric alcohols, particularly halohydrins, such as monohalohydrins and alkylene oxides.

In the specification and claims the expression "halogen fatty acid" or "monohalogen fatty acid" includes, wherever the context permits, monochlor-, monobrom- and mono-iodo-fatty acids themselves, their derivatives (such as esters) and their salts, as well as substances and mixtures of substances which yield monohalogen fatty acids or their derivatives.

The expression "shaped structures" used in the specification and claims is intended to include: Artificial threads, particularly artificial silk and staple fibre, artificial hair, artificial straw, film of every kind, bands and plates of every kind, plastic masses of any description; adhesives and cements, finishes, coatings and layers of every kind, particularly such as are applicable in finishing, filling and dressing of textile fabrics, sizing of yarn, thickening agents or fixing agents for pigments in textile printing and the like; paper-like surfacing, paper-sizing; in the manufacture of artificial leather or of book cloth or of tracing cloth or of transparent paper or of transparent cloth and the like.

The term "artificial threads" denotes artificial threads and spun goods of all kinds, for instance artificial silk, artificial cotton, artificial wool, artificial hair and artificial straw of any kind.

The term "hydroxy acid residue" used in the appended claims is intended to cover that part of a hydroxy acid after the removal of the hydrogen atom of the hydroxyl group, thus

HO—CH₂—COOH is hydroxyacetic acid and —O—CH₂—COOH is the hydroxyacetic acid residue.

What I claim is:

1. The process which comprises heating, at a temperature between 40° C. and about 250° C. for a period ranging from 12 to 24 hours at the lower temperature limit to about 5 minutes at the higher temperature limit, a neutralized, washed and dried cellulose ether obtained by reacting alkali cellulose with an etherifying agent in the proportion of 1 mol. of etherifying agent to 2 to 8 C₆H₁₀O₅ units, and which cellulose ether can be dissolved in dilute caustic alkali solution only at substantially below 0° C., said heating being conducted entirely in an inert environment free from acids stronger than carbonic acid, and free from the anhydrides of acids stronger than carbonic acid, whereby alkali solubility, viscosity characteristics and dynamometric properties of said ether are improved.

2. The process which comprises heating, for about 12 to 24 hours at a temperature of about 100° C. a neutralized, washed and dried cellulose ether obtained by reacting alkali cellulose with an etherifying agent in the proportion of 1 mol. of etherifying agent to from 2 to 8 $C_6H_{10}O_5$ units, and which cellulose ether can be dissolved in dilute caustic alkali solution only by refrigeration to ice temperatures, such heating being done while said cellulose ether is in a substantially dry condition, and free from acids stronger than carbonic acid and free from the anhydrides of acids stronger than carbonic acid, whereby alkali solubility, viscosity characteristics and dynamometric properties of said ether are improved.

LEON LILIENFELD.